United States Patent [19]

Kao et al.

[11] Patent Number: 4,837,053

[45] Date of Patent: Jun. 6, 1989

[54] DIFFUSION BARRIER FOR HIGH TEMPERATURE COMPOSITES

[75] Inventors: Wei H. Kao, Rancho Palos Verdes; Howard A. Katzman, Los Angeles; Eric M. Slater, Redondo, all of Calif.

[73] Assignee: The Aerospace Corporation, El Segundo, Calif.

[21] Appl. No.: 235,348

[22] Filed: Aug. 23, 1988

[51] Int. Cl.$^4$ ............................................... B05D 7/00
[52] U.S. Cl. ...................................... 427/214; 427/2; 428/604; 428/608; 148/63; 148/242; 148/285

[58] Field of Search ................. 427/214, 217; 148/6.3; 428/604, 608

[56] References Cited

U.S. PATENT DOCUMENTS 4,565,744  1/1986  Walter ................................. 428/614

Primary Examiner—Sam Silverberg
Attorney, Agent, or Firm—William J. Burke

[57] ABSTRACT

Filaments are coated with MgO to create an effective diffusion barrier between the filament and the matrix in a metal matrix composite, thereby improving the strength and the service life of the composite.

1 Claim, No Drawings

DIFFUSION BARRIER FOR HIGH TEMPERATURE COMPOSITES

STATEMENT OF GOVERNMENT INTEREST:

The invention described herein may be manufactured and used by or for the Government of the United States for governmental purposes without the payment of royalty therefor.

BACKGROUND OF THE INVENTION

1. FIELD OF THE INVENTION

The invention relates to a method for applying a diffusion barrier coating to filaments, specifically coated boron and silicon carbide filaments.

2. DESCRIPTION OF THE PRIOR ART

The demands for better performance of advanced aircraft and for reusability of space reentry vehicles have resulted in many new innovative materials. In recent years, the development of metal matrix composites (MMCs) has been vigorously pursued. The incorporation of high strength and high stiffness ceramic filaments into a ductile metal matrix can produce a composite material of low density that exhibits good mechanical properties at elevated temperatures. Various metallic alloys together with various forms of ceramic reinforcements have been investigated for chemical compatibility, composite mechanical properties, and failure mechanisms. MMCs have been shown to be satisfactory material systems if, in addition to high-temperature strength and oxidation resistance, the reinforcement and matrix are chemically compatible.

One matrix of interest is titanium. Titanium and its alloys are used extensively because of their good corrosion resistance and their high specific strengths at both room and moderately elevated temperatures. However, they are used only below 540° C. (1000° F.) since their strength drops rapidly above that temperature. By reinforcing titanium alloys with boron-based or silicon carbide-based filaments, large increases in specific stiffness and strength, both at room and elevated temperatures, can be achieved. However, due to the inherent high chemical reactivity of titanium metal, the properties of the Ti MMCs are limited by the extent of fiber/matrix interface reaction. The mechanical properties fall far short of the expected values.

The major reason for composites not achieving the expected mechanical properties is the detrimental chemical reactions that occur between the reinforcing fiber and matrix during fabrication of the composite and during service. The most serious problem is the formation of intermetallic compounds that seriously degrade the mechanical properties of the fibers.

There are three principal ways of reducing the deleterious interface reactions: (1) lower the composite fabrication or use temperature; (2) modify the chemistry of the matrix or reinforcement material; or (3) apply a diffusion barrier coating to the reinforcement. This invention addresses the development of a diffusion barrier coating process.

It is therefore an object of this invention to develop a successful diffusion barrier coating which reduces the reaction rate and also provides good bonding between the fibers and matrix. Another object of this invention is to develop a coating technology which can coat fibers continuously and uniformly as needed. It is also an object of this invention to Provide a diffusion barrier material which provides: a high melting point, chemical stability at high temperature, low density, compatible coefficient of thermal expansion (CTE) with that of the fiber and a low chemical reactivity at high temperatures with both the reinforcing fibers and the metal matrix. Magnesium oxide is one of the few materials that meets the requirements of being chemically stable and also has a good CTE match with the fibers of interest.

SUMMARY OF THE INVENTION

The invention discloses a process for applying a diffusion barrier coating of magnesium oxide (MgO) to filaments for use in a metal matrix composite (MMC). The process for coating fibers with a MgO diffusion barrier entails three steps: (1) precoating with silicon dioxide ($SiO_2$) to facilitate wetting and adhesion by magnesium, (2) immersion into a Mg-Sn molten metal bath, followed by (3) air oxidation of the adhered Mg to MgO. The $SiO_2$ coating is applied by immersing the fibers in a solution of organosilicon compounds followed by hydrolysis or pyrolysis of the silicon compounds to $SiO_2$ on the fiber surfaces.

DETAILED DESCRIPTION OF THE PREFERRED EMBODIMENT

The method for applying a diffusion barrier coating to filaments for use in a metal matrix composite (MMC) as taught by the present invention is simple but effective. The method consists of first pre-coating the filaments with a layer of silicon dioxide, immersing the filaments in a molten Mg-Sn bath and then oxidizing the coating. The total coating thickness obtained is approximately 1.5–3 $\mu$m. The coating consists of MgO on its outer surface, a Mg/Sn alloy intermediate, and a predominately $Mg_xSiO_{2+x}$ layer adjacent to the filament. Two types of filaments, $B_4C$-coated boron and SiC-based, were studied. The $B_4C$ coated filament (5.6 mils in diameter) consists of a 2-$\mu$m thick $B_4C$ coating on a substrate of boron with a tungsten core. The SiC (SCS-6) filament (5.6 mils in diameter) is a carbon-core silicon carbide filament with a modified carbon-rich surface developed by AVCO for use as a reinforcement for titanium alloys.

Filaments both as-received and $SiO_2$-coated conditions can used in the present invention. The $SiO_2$ coating remotes wetting between the filament and the molten magnesium and its alloys. A solution coating process is employed to achieve a thin layer of $SiO_2$ on the filaments surface. Improved wetting results in a well-adhered, continuous coating. During the SiO solution coating process, the filaments are immersed in a toluene solution of silicon tetrachloride ($SiCl_4$, 5-10 percent by volume) and tetraethylorthosilicate (TEOS, 5-10 percent by volume) at room temperature for 30 seconds. The filaments are then hydrolyzed for one minute in water vapor and heat-treated for two minutes at 550° C. in air in order to vaporize any excess solvent and to convert the hydrated oxide to $SiO_2$. This process can be repeated several times to insure complete coating.

The precoated fibers are then immersed in a molten bath containing 80 percent by weight (95 atomic percent) Mg and 20 percent by weight (5 atomic percent) Sn at 560°–610° C. for three minutes. A magnesium-tin alloy rather than pure magnesium was chosen for several reasons: (1) the alloy melts at a lower temperature than pure magnesium, (2) the alloy oxidizes at a slower rate than pure magnesium, (3) the Sn reduces the molten bath vapor pressure; and (4) the Sn provides an increase in the fluidity of the molten metal. Because of these reasons, the Mg-Sn alloy is much easier to work with.

Immersion in the Mg-Sn alloy results in a surface coating of Mg-Sn on the filament surfaces To convert this surface layer to MgO, the filaments are heated in air at 250° C. for five minutes during which the Mg in the surface layer is Preferentially oxidized to form a MgO coating.

Scanning electron microscopy reveals a smooth and continuous coating of MgO. No spalling of the coating is observed when the coating is scratched with a knife edge and the coating appears well bonded to the filament. Ion microprobe mass analysis shows that the coating consists of magnesium oxide on its outer surface, a Mg/Sn alloy intermediate layer, and a predominately magnesium silicate layer adjacent to the filament. The total thickness is approximately 1.5-3 $\mu$m.

The effectiveness of the MgO coating as a diffusion barrier was demonstrated by testing the chemical compatibility of the coated fibers with a titanium alloy. Sections of both MgO-coated and as-received $B_4C$-coated boron filaments were vacuum hot Pressed with Ti-6Al-4V powder in the same die to insure that both coated and uncoated filaments went through exactly the same time, temperature and pressure cycle. After consolidation, the combined specimen was heat treated in vacuum for six hours at 900° C. Optical photomicrographs of polished cross-sections of the fibers, both as-received and coated with MgO, were compared. The photomicrographs showed that the boron-carbide coating on the as-received fibers reacted severely with the titanium matrix. In contrast, the $B_4C$ surface of the MgO-coated filament was smooth, showing a much lesser reaction. Moreover, scanning electron microscopy revealed that a thin layer of MgO still surrounded the filament. This experiment demonstrated that the coated filaments are better protected against the titanium alloy.

The outer MgO surface is an effective diffusion barrier against the Ti-6Al-4V matrix. After six hours at 900°C., the $B_4C$ surface of the MgO-coated filament is smooth and free from deleterious reactions with the titanium matrix indicating that the $B_4C$-B filament strength is preserved. In addition, the interface reaction zone thickness between the coated $B_4C$ filaments and the matrix was found to be only 60% of that of the interface reaction zone between the uncoated $B_4C$ filaments and the matrix. The reduction in the rate of the deleterious reaction at the interface indicates that the coated $B_4C$ filaments will not be degraded as rapidly at elevated temperatures; therefore, longer service life is expected. The method claimed in the present invention represents a way to increase the service life of the composites at elevated temperatures, because of the reduction in the amount of interface reaction between the reinforcing filaments and matrix material.

In addition to matrices made from titanium and its alloys, MgO is also expected to be an effective diffusion barrier in other high-temperature matrices including nickel, iron or cobalt-based superalloys as well as ceramic or glass ceramic composites. It is also expected to find use in metal or ceramic composites reinforced with other types of high strength ceramic or metallic filaments.

We claim:

1. A continuous process for creating a uniform MgO fiber coating for use as diffusion barrier between the filaments and matrix in a metal matrix composite, comprising of steps of:
   a. passing the filaments through a silicon dioxide precursor solution;
   b. chemically converting the silicon dioxide precursor to silicon dioxide;
   c. immersing the $SiO_2$-coated filaments in a molten magnesium alloy bath;
   d. heating the filaments in air to at least 250° C., thereby oxidizing the magnesium to magnesium oxide and creating a uniform MgO coating on the filaments.

* * * * *